INVENTORS
EDWIN A. ROSIN
URBAN P. TRUDEAU
BY
ATTORNEYS

INVENTORS
EDWIN A. ROSIN
URBAN P. TRUDEAU
ATTORNEYS

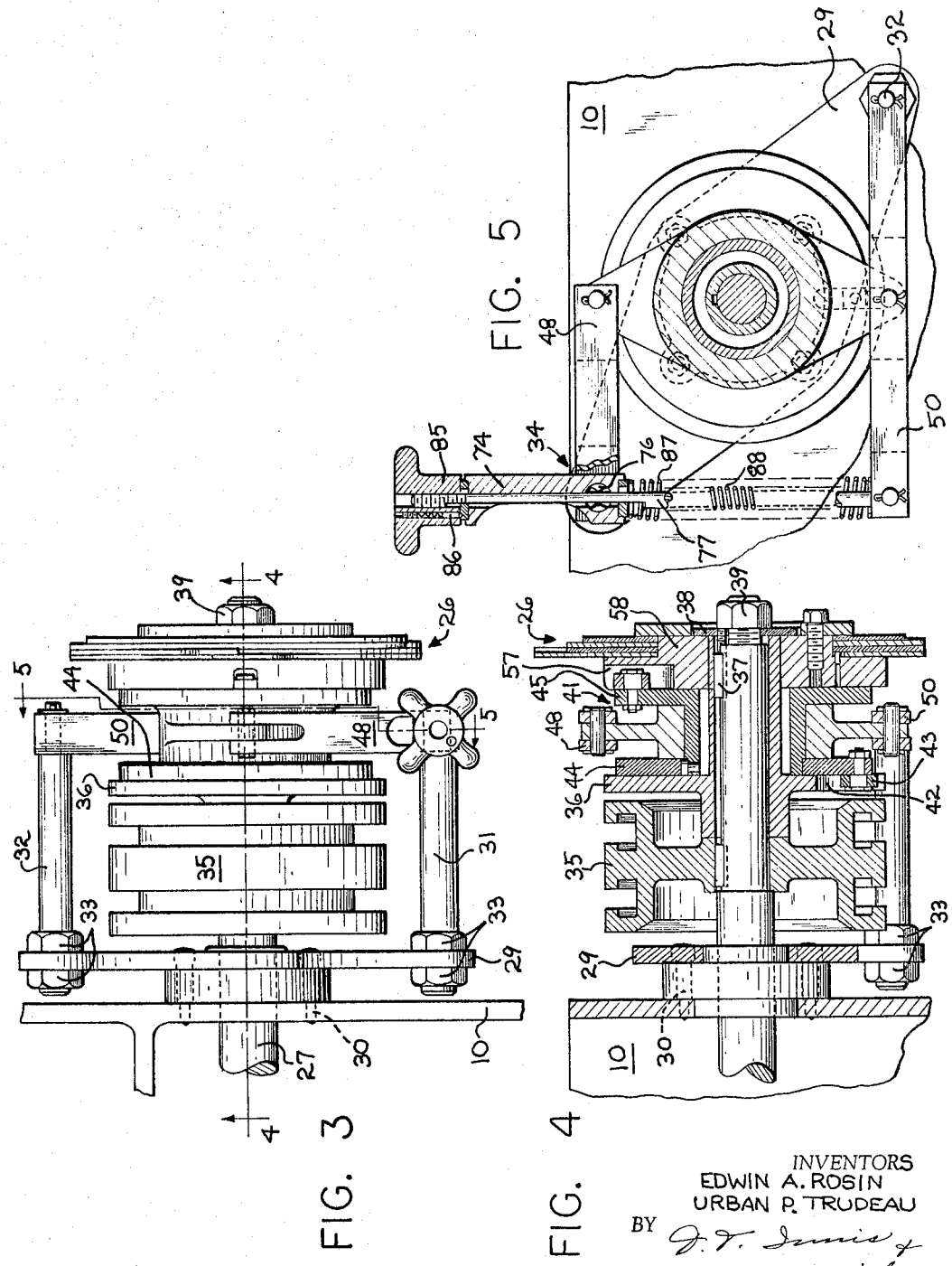

INVENTORS
EDWIN A. ROSIN
URBAN P. TRUDEAU
ATTORNEYS

United States Patent Office 3,267,750
Patented August 23, 1966

3,267,750
CAM SPEED ADJUSTING MECHANISM
Edwin A. Rosin and Urban P. Trudeau, Toledo, Ohio, assignors to Owens-Illinois Glass Company, a corporation of Ohio
Filed Aug. 4, 1964, Ser. No. 387,458
3 Claims. (Cl. 74—69)

This invention relates to apparatus for adjusting the instantaneous, angular velocity of a driven member while the member is in motion.

More particularly, this invention relates to a system for selectively adjusting the drive coupling between a drive shaft and a co-axial driven cam carrying member so as to selectively adjust the angular velocity of the cam in relation to the angular velocity of the drive shaft.

This invention has particular utility in a glass forming machine wherein the parisons or blanks are formed in inverted position and are inverted to a blow mold position through the use of a neck mold carrying invert arm.

It should be readily recognized that in the formation of blown glassware such as bottles, particularly of the narrow neck type wherein an invert arm is used for transferring the parisons from the parison forming station to the blow station, that the drive mechanism for the invert arm be capable of close control and be adjustable independent of the speed of the machine drive. It is also desirable to be able to change the machine drive speed without changing the speed of the invert motion. During invert it is necessary that the parisons be transferred such that the centrifugal force and gravity be balanced throughout the period of invert to prevent bending of the parisons out of line. The optimum invert speed is determined by the radius of invert, which is the distance from the center of rotation to the center of mass of the parison.

The optimum invert speed is not affected by the shape and mass of the parisons; however, the parison shapes and masses do determine the allowable deviation in the invert speed from the optimum; slender parison shapes have less bending resistance and massive parisons have increased bending tendencies. Obviously, the speed of the parison during invert is quite critical.

In many of the glass forming machines the parisons are inverted by hydraulic motors and the operation of the motors is controlled by the positioning of a pilot valve. The pilot valve in most cases is controlled in its movement by a cam follower arm, as is the case in the present invention. Inasmuch as a cam follower arm is being moved in accordance with the contour of the rotating cam, it is incumbent that the axis of the cam be maintained fixed so that the mechanical relationship between the cam surface and the cam follower arm not be disturbed.

With the foregoing in view, it is an object of this invention to provide mechanism for selectively adjusting the angular velocity of a rotating cam, which cam is effective to control the speed of the invert motion.

It is a further object of this invention to provide a mechanism for adjusting the instantaneous angular velocity of a driven member while the member is being driven.

It is a still further object of this invention to provide a cam mounting and drive mechanism which is adjustable within closely controlled limits.

It is an additional object of this invention to provide adjustable mechanism for varying a parison invert arm speed which is capable of being adjusted to a specific invert time in seconds relative to specific machine speeds in cycles per minute.

Other and further objects will be apparent from the following description taken in conjunction with the annexed sheets of drawings, wherein:

FIG. 3 is a top plan view of the cam supporting mechanism of FIG. 2;

FIG. 4 is a cross-sectional view taken at line 4—4 of FIG. 3;

FIG. 5 is a cross-sectional view taken at line 5—5 of FIG. 3;

This invention relates to glass forming equipment of the type in which the operations of a glass forming machine are controlled by the contour of rotating cams. These machines are conventionally of the type utilizing hydraulic fluid, such as oil, as the main power source for the various mechanical movements involved in the operation of the machine. Since this invention is specifically directed to mechanism for controlling the invert speed of an invert arm of a glass forming machine, the following description is limited to that part of a glass forming machine which is necessary to explain the utility and function of the invention.

The details of the specific invert arm drive mechanism are disclosed in co-pending application Serial No. 382,534, filed July 14, 1964.

Figure 1:
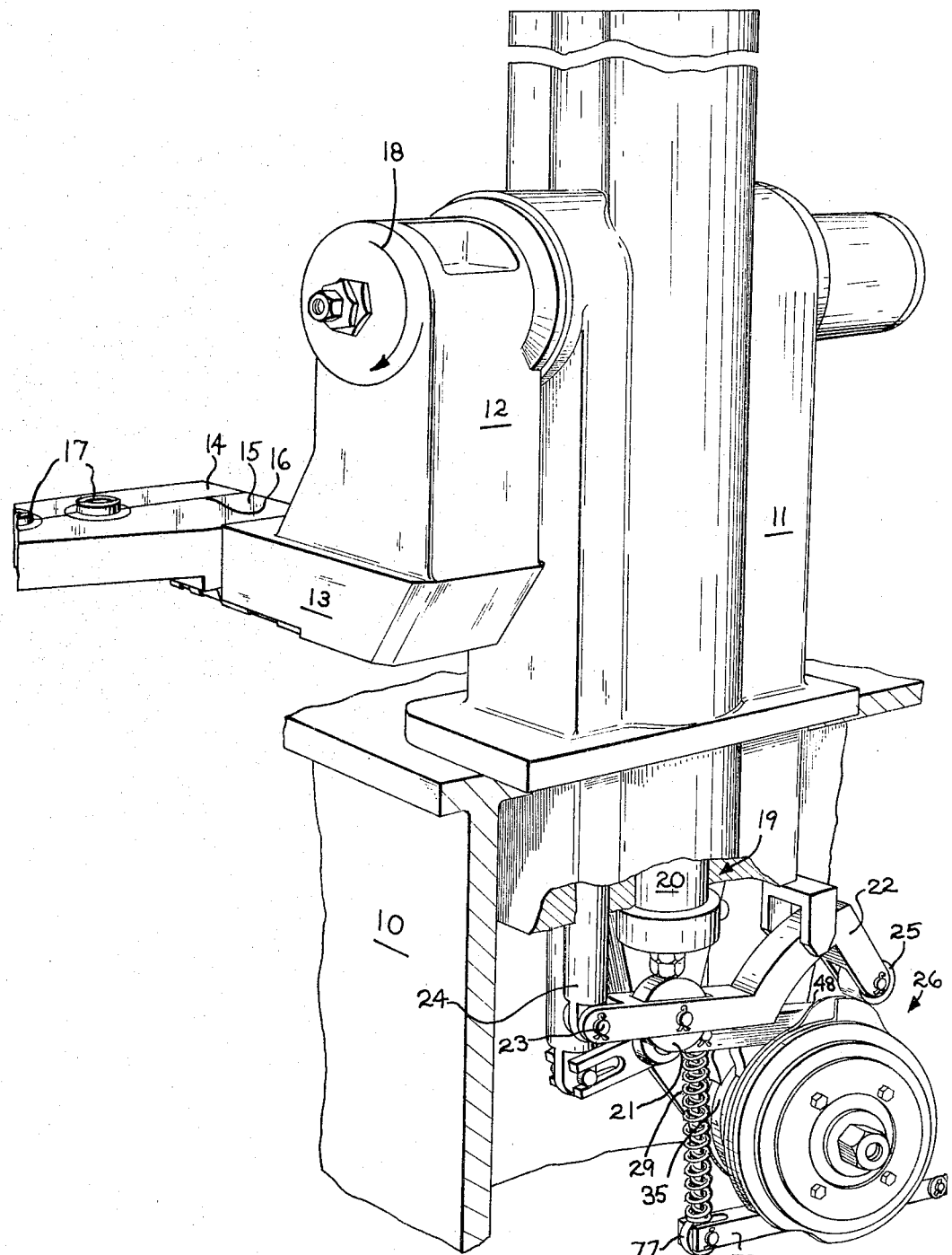
FIG. 1 is a perspective view of an invert arm support and cam mechanism for controlling the invert movement.
Figures 2, 9B:
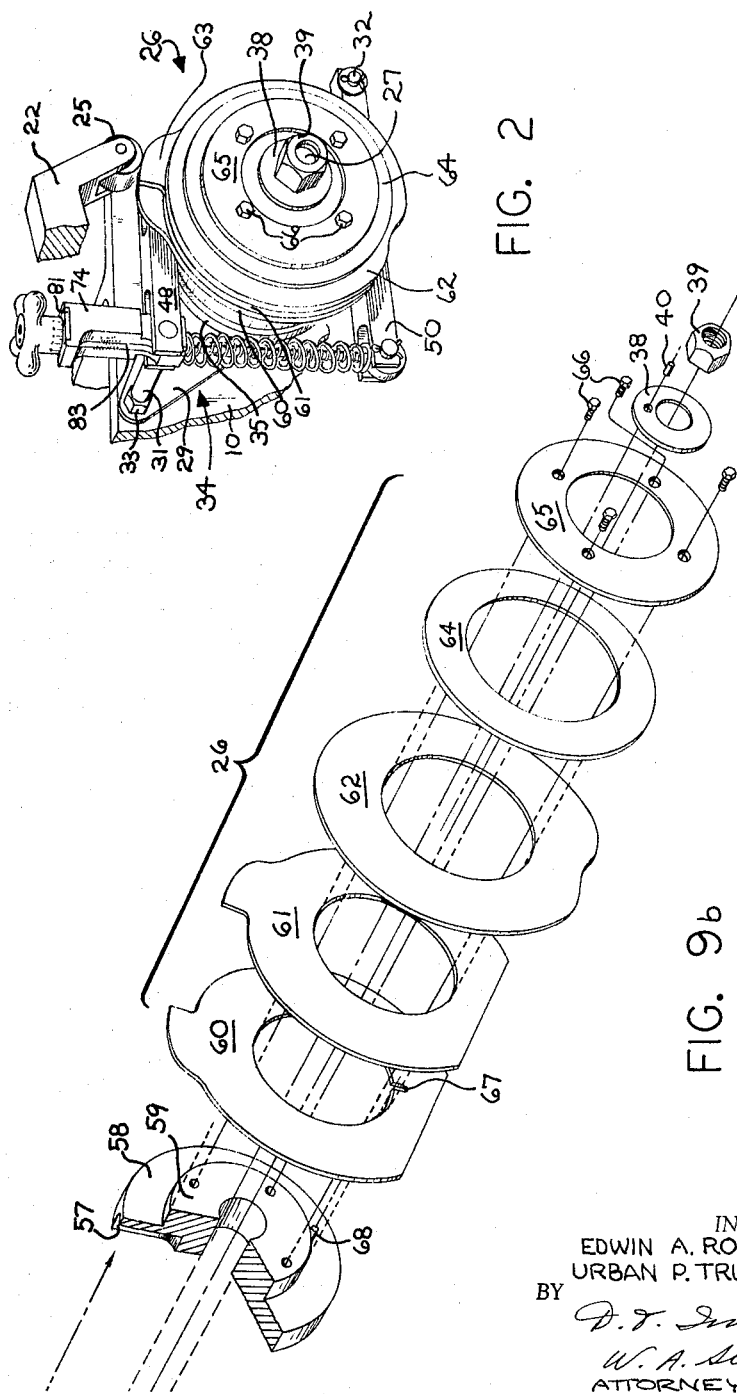
FIG. 2 is a perspective view of the cam supporting and speed adjusting mechanism of the invention.
FIGS. 9a and 9b, taken together, constitute an exploded view of the mechanism of FIG. 2.

With reference to FIG. 1, the general operation of the invert mechanism will be described. A main machine base 10 supports a vertically extending casting 11 which has a horizontal opening formed therethrough within which the invert arm spindle extends. An invert arm 12 is connected to the spindle and has a horizontally extending portion 13 formed thereon to which are connected a pair of neck mold supporting members 14 and 15. The two neck mold support members 14 and 15 are complementary to each other and are adapted to be opened and closed along the split line 16 to effectively open and close the neck molds 17 carried thereby. The invert arm 12 is inverted by rotating 180° in the direction of the arrow 18 shown thereon by the operation of a pair of vertically extending racks (not shown) mounted within the casting 11. The introduction of oil under pressure to the racks is controlled by the position of a pilot valve, generally designated 19. The pilot valve 19 is comprised of a shiftable spool 20. The position of the spool determines the rate of flow of oil under pressure from a suitable source to the driving piston racks. The spool 20 is biased downwardly in contact with a roller 21 carried by a lever 22 intermediate the ends thereof. The lever 22 is connected by a clevis pin 23 to the end of a rod 24 which, for the purpose of explanation of the present invention, may be considered to be fixed in the casting 11. The opposite end of the lever 22 carries a roller 25 which is adpated to ride in contact with the surface of a driven composite cam, generally designated 26. It can readily be seen that as the cam 26 is rotated, its peripheral surface will pivot the lever 22 about the clevis pin 23 and will shift the spool 20 of the pilot valve 19. In this manner the cam controls the speed of operation of the invert arm 12 in its invert movement.

As explained above, it is desirable when making parisons that the invert arm of the forming machine have its invert movement adjusted with respect to the main machine drive speed. As sometimes happens, it is desirable to speed up the whole machine operation without changing the speed of the invert or, in some cases, the speed of the invert is not what would be considered the optimum speed from the standpoint of providing transfer of parisons without distortion.

It should also be readily recognized that a particular glass forming machine does not normally produce the same size and weight of bottle all the time, but must be versatile enough to produce a range of sizes and weights of bottles.

Obviously, if the machine is to produce a range of bottle sizes and weights it is necessary that the forming and blow times be different with no change in invert speed, thus also requiring adjustment of the cycle time when changing from one job to another in order to produce defect-free glass containers.

In the past this has been accomplished by changing the invert cam setting or to substitute a different cam whose contour has been worked out ahead of time. However, these extra cams are expensive and will only function satisfactorily when the machine speed is known and does not have to be changed. Usually it becomes desirable to change the machine speed while at the same time maintain the speed of the invert at a constant level. When dealing with fixed cams, it would then be necessary to replace the cam.

With the present mechanism of the invention, applicants are capable of adjusting the angular velocity of that portion of the invert cam which controls the invert operation within limits, so that it is necessary to have a large selection of complex cams and also adjustment of the cam speed may be made while the machine is in operation.

Turning now to FIGS. 2–9, the details of the cam supporting and drive mechanism will be described.

The machine base 10 has a shaft 27 extending outwardly therefrom. The shaft is geared to the main rotary drive mechanism (not shown) of the forming machine and extends through a bearing 28 mounted on a vertical wall of the machine base 10. The bearing 28 acts as a spacer between the machine base 10 and a drive mounting plate 29. The driving mounting plate 29 is fixed to the machine base 10 by four bolts 30 which pass through it and the housing of the bearing 28.

As can best be seen when viewing FIGS. 3 and 4, the drive mounting plate 29 is spaced from the machine base 10 and is somewhat elongated in form. Adjacent the ends of the mounting plate 29, at diametrically opposed points thereon, are fastened an upper post 31 and lower post 32. Both posts extends horizontally and are fixed to the mounting plate by pairs of nuts 33 threaded thereon on opposite sides of the mounting plate. The two posts 31 and 32 serve as the support for an adjustment assembly, generally designated 34.

The shaft 27 has a timing drum 35 mounted thereon. The drum 35 is designed to carry adjustable cams in slots provided therein which are used to control other operations of the forming machine which necessarily must occur in timed sequence with the invert motion. For purposes of this description, this timing drum 35 may be considered nothing more than a spacer element. The power shaft 27, after passing through the drum 35, carries an invert cam drive hub 36 which is keyed to the shaft by means of a key 37.

Figure 9A:
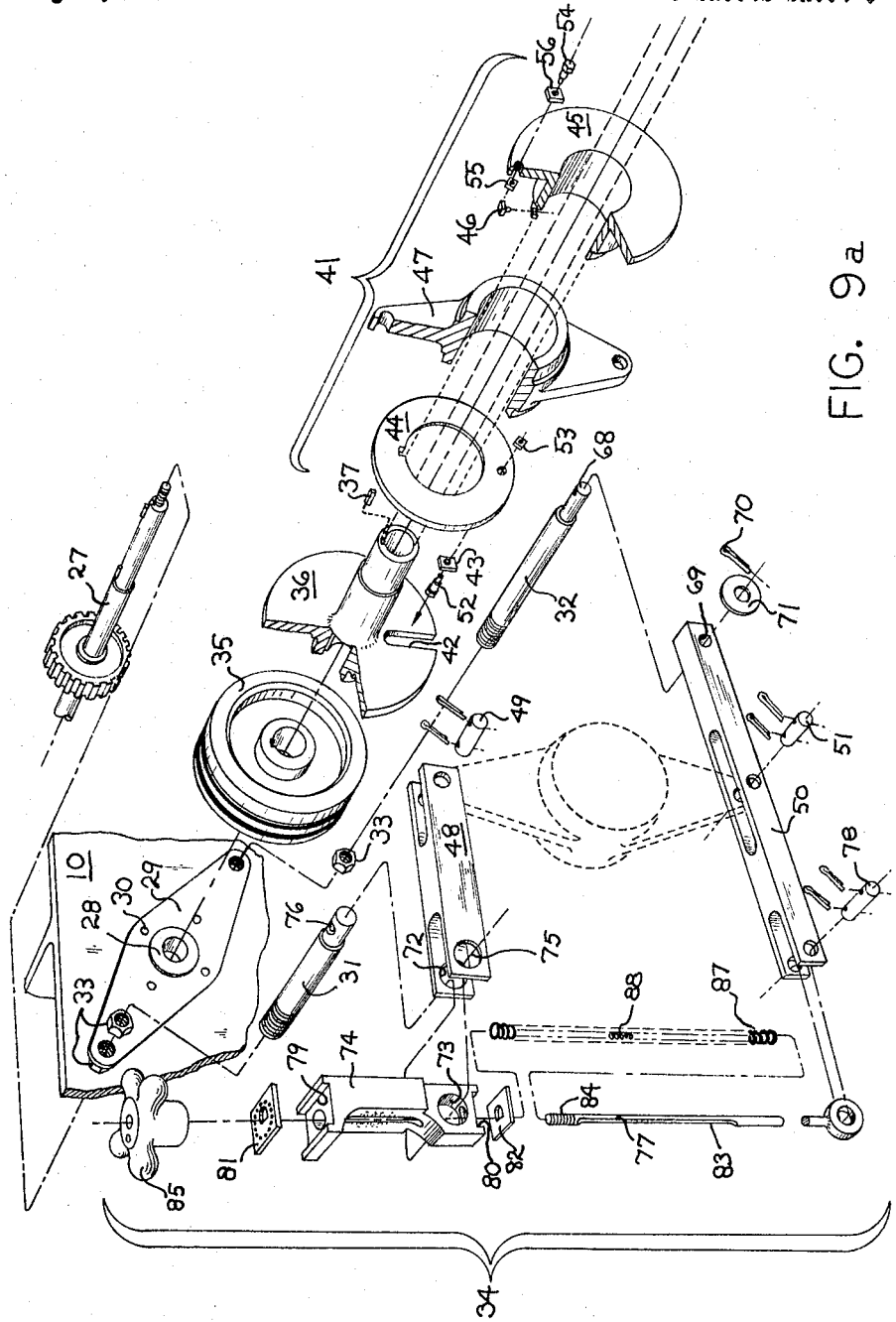

As can be seen when viewing FIGS. 4 and 9, the hub 36 has an axially extending portion and the hub is axially held on the shaft 27 by means of a washer 38 and nut 39 threaded on the end of the shaft. A pin 40 which extends through the washer 38 seats within the key-way, for the key 37, in the hub 36 and effectively provides a locking arrangement for the washer 38 to prevent its displacement or rotation with respect to the nut 39 or shaft 27.

The remainder of the cam supporting structure is mounted on the horizontally extending portion of the drive hub 36, with the exception of an intermediate hub assembly, generally designated 41. The intermediate hub assembly 41 is mounted on and held in its adjusted position by the adjustment assembly 34. The intermediate hub assembly 41 is mounted generally co-axial with respect to the invert cam drive hub 36; however, as later will be described, the intermediate hub assembly 41 may have its axis adjusted with respect to the axis of the power shaft 27 and cam drive hub 36.

Figure 8:
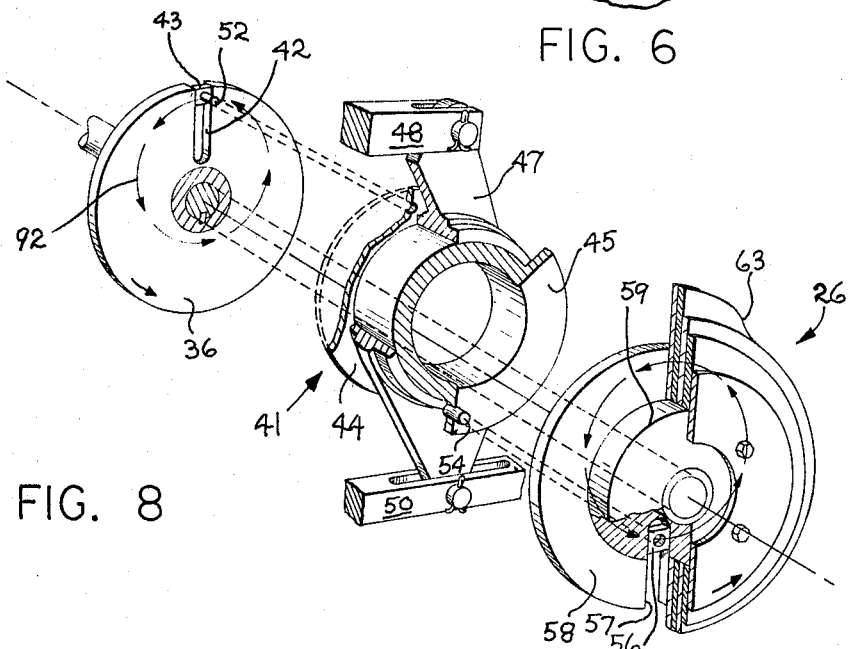
FIG. 8 is a partially exploded view of the cam supporting and drive coupling mechanism of the invention.

As best shown in FIGS. 8 and 9, the cam drive hub 36 has a radially extending slot 42 formed therein which serves as the guiding member for a slide block 43. The slide block 43 forms an important part of the intermediate hub assembly 41 and is carried by an intermediate hub plate 44. The intermediate hub plate 44 in turn is keyed to an intermediate hub 45 by a key 46. The intermediate hub 45 is supported by a yoke 47 within which the intermediate hub 45 is adapted to rotate. The yoke 47 is connected to an upper arm 48 by a clevis pin 49 and a lower arm 50 by a clevis pin 51. Both the arms 48 and 50 form a part of the adjustment assembly 34 to be described hereinafter.

As previously described, the slide block 43 is connected to the intermediate hub plate 44 by a stud 52 and nut 53. Thus it can be seen that all rotary motion of the invert cam drive hub 36 is transmitted by the slide block 43 to the intermediate hub plate 44 and intermediate hub 45.

The intermediate hub 45 also carries a stud 54 and nut 55 to which a second slide block 56 is attached. The slide block 56 is adapted to ride within a radial slot 57 formed in a driven hub 58. The driven hub 58 is mounted on the axially extending portion of the invert cam drive hub 36 and is rotatable with respect thereto.

It should be noted that the two sliding blocks 43 and 56 are fixed to the intermediate hub asesmbly 41 at diametrically opposed points with respect to each other. In other words, the two sliding blocks are spacially oriented 180° apart. Thus it can be seen that the intermediate hub assembly 41 serves as a transmission between the invert cam drive hub 36 and the driven hub 58. Both the drive hub 36 and the driven hub 58 rotate concentric with respect to the drive shaft 27. However, the intermediate hub assembly 41 is shiftable radially so as to place its axis either concentric or eccentric, depending upon the movement or adjustment applied thereto by the yoke 47. When the axis of the intermediate hub assembly 41 is concentric with respect to the drive shaft 27, both the drive hub and the driven hub will rotate at the same instantaneous, angular velocity.

As can readily be seen, when the intermediate hub assembly 41 is shifted to place its axis eccentric with respect to the drive shaft 27, the driven hub 58 will exhibit a non-linear, angular velocity through one rotation. In other words, it will be driven such that its peripheral speed will vary during a 360° rotation thereof.

The driven hub 58 has an annular shoulder 59 formed integral therewith on which the composite cam 26 is fixed. The composite cam 26 is actually made up of several cam elements 60, 61 and 62. The two cam elements 60 and 61, when assembled together on the shoulder 59 of the driven hub 58, form a lobe 63 which determines the period and speed control for the parison invert operation. The cam element 62 has a slightly depressed peripheral area which defines the period of revert motion of the invert arm. The periods in between are, generally speaking, the period of blow of the parison and the period of parison forming when the invert arm is stationary.

As best seen in FIGS. 8 and 9, the cam elements 60, 61 and 62, along with a spacer element 64, are fastened to the driven hub 58 by a clamp plate 65 and bolts 66. It should be noted that the cam element 60 is provided with a small slot 67 which is adapted to key on a pin 68 fixed to the driven hub 58. In this manner the cam element 60 is prevented from changing its orientation with respect to the driven hub 58 during the adjustment of the other cams 61 and 62. The cam elements 61 and 62 may be adjusted, prior to clamping, within certain limits merely by rotating them with respect to the driven hub 58; however, the cam element 60 maintains its orientation with respect to the hub 58 at all times.

Turning now specifically to the adjustment assembly 34, it can be seen that this assembly is held in place by the upper and lower posts 31 and 32. The post 32 is provided with a smaller diameter end 68 which fits within a hole 69 in the arm 50. The small end 68 of the lower post 32 is held within the opening in the arm 50 by means of a cotter key 70 with a washer 71 interposed the key 70 and the arm 50. The extending end of the upper post 31 has a slightly smaller diameter than the main body portion and extends through a hole 72 in the bifurcated end of the upper arm 48 and also extends through a hole 73 in an adjustment block 74 and a second hole 75 formed in the arm 58. The upper post 31 in that portion thereof which extends through the block 74 is provided with a vertical opening 76 and when in assembled relationship with respect to the block 74 and arm 48 serves to provide a passage for an adjustment rod 77.

As best seen when viewing FIG. 5, the opening 76, provided in the upper post 31, is designed so as to have a pair of opposed fulcrum points which permit angular adjustment of the rod 77 with respect to the opening 76 but maintains the rod centrally of the opening. The lower end of the adjustment rod 77 is formed with an eye by which it is pivotally connected to the lower arm 50 through the use of a clevis pin 78. The adjustment block 74 is provided with a pair of recessed slots 79 and 80 at its upper and lower ends respectively. These slots retain a pair of washers 81 and 82 which have a particular configuration with respect to the central holes therein so as to prevent rotation of the rod 77.

It should be noted that the rod 77 has a flattened surface 83. This flattened surface is engaged by the straight edge of the holes formed in the washers 81 and 82. The upper end of the rod 77 is threaded at 84 with precision formed machine threads. In assembled position, as shown in FIG. 5, a threaded knob 85 is threaded on to the end of the rod 77. The upper surface of the washer 81 is provided with a series of circumferentially spaced recesses within which a spring biased detent 86, carried by the knob 85, is adapted to successively seat to provide a positive engagement between the knob and the adjustment block 74.

A pair of springs 87 and 88 are mounted coaxially with respect to the adjustment rod 77 with one end of the springs resting against the washer 82 and the other end against the lower arm 50. The purpose of these springs is to bias the arms 48 and 50 apart so as to maintain their adjusted position determined by the rotation of the knob 85 relative to the rod 77.

Figure 7:
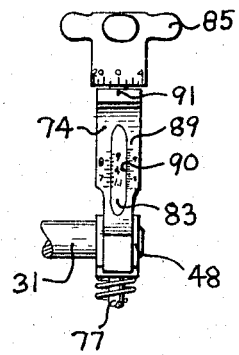
FIG. 7 is a side elevational view of the adjusting knob and indicator portion of the mechanism of FIG. 6.

It will be readily appreciated that adjustment of the adjustment assembly is made by turning the knob 85 and in order to facilitate the accurate setting of the adjustment assembly, the rod 77 and the block 74 are provided with calibrations, as best shown in FIG 7.

The block is provided with calibrations at 89 which cooperate with an indicium 90 formed on the rod 77. A reference mark 91 is provided at the top of the block 74, and in conjunction with the indicia formed on the knob 85 provide a micrometer reading of the specific position of the intermediate hub assembly 41 with respect to the axis of the drive shaft 27. Calibrations may conveniently be such as to indicate the position of the intermediate hub axis above dead center.

A second set of indicia are provided on the left-hand side of the rod 77 and block 74 which conveniently may be set up to provide a vernier reading of the ratio of invert time in seconds to machine speed in cycles per minute based on an invert time of one second or a 45° cam rotation at seven and a half cycles per minute machine speed.

With the machine speed known, it is only necessary to make the adjustment as indicated by the left-hand indicia with the desired invert time in seconds as shown by the indicia on the rod. Alternatively, the actual position of the intermediate hub axis with respect to drive axis, may be accurately set with reference to the indicia at the right-hand side of the block 74.

Figure 6:
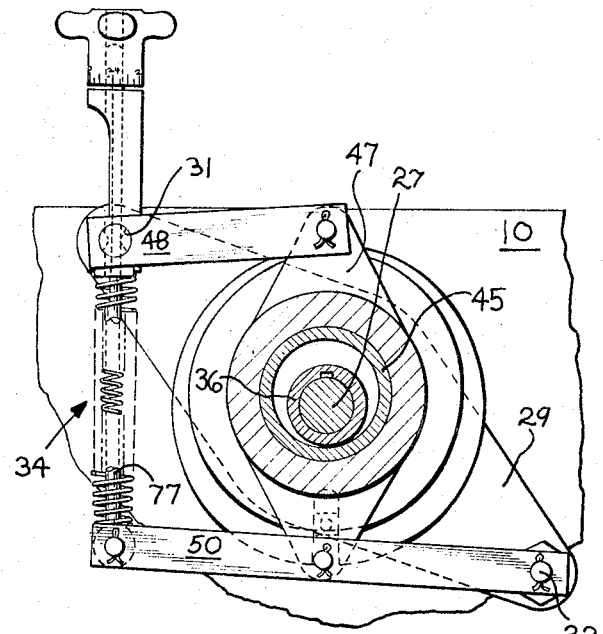
FIG. 6 is a cross-sectional view similar to FIG. 5 showing the mechanism adjusted to an extreme position.

Having now described in detail the mechanism of the invention, in summary it can be seen that if the yoke is positioned such that its axis coincides with the axis of the shaft 27, the driving hub 36 and the driven hub 58 will run at the same angular velocity. However, upon shifting of the yoke with the adjustment assembly 34, the intermediate hub assembly 41 will be moved such that its rotational axis is displaced from that of the drive shaft 27, for example as shown in FIGS. 6 and 8. When adjusted in this manner the slide block 43 will describe a circle as indicated by the arrow 92 in FIG. 8, with a parallel circle being described by the movement of the slide block 56. This will then obviously result in a situation where the angular velocity of the driven hub 58 and the composite cam 26 carried thereby will be different from that of the driving hub 36. While the total time that it takes to drive the cam through 360° will not change with respect to the rotational speed of the shaft 27, the instantaneous angular velocity of the cam 26 will be adjusted by the shifting of the yoke and the intermediate hub assembly so that the period of invert may be speeded up or slowed down without changing the speed of rotation of the shaft 27, within limits.

Thus it can be seen that applicants have provided an adjustable cam drive mechanism which has particular utility in the control of the invert mechanism of a glass forming machine.

Various modifications may be resorted to within the spirit and scope of the appended claims.

We claim:

1. A continuous cam control apparatus comprising, a main support member, a drive shaft extending from said support member, a first hub connected to said shaft and rotated thereby, a radially extending slot formed in said first hub, a second hub mounted for rotation on said shaft and having a radially extending slot formed therein, said slots being displaced 180° with respect to each other, an intermediate hub positioned between said first and second hubs, said intermediate hub having a pair of slide blocks connected thereto and positioned within the slot in said first and second hubs respectively, said slide blocks being mounted to said intermediate hub at equal radial distances from the axis thereof, a yoke surrounding and supporting said intermediate hub for rotation, a pair of posts fixed to said support and extending outward therefrom in a direction parallel to and on opposite sides of said shaft, a first arm having its ends pivotally connected to one of said posts and said yoke, a second arm pivotally connected between the other post and a diametrically opposed point on said yoke, said second arm having an extension thereon, means connected between said first arm and the extension of said second arm for varying the spacing therebetween to shift the axis of said yoke and intermediate hub, and cam means fixed to said second hub, whereby the peripheral speed of a sector of said cam may be adjusted as the cam is rotated.

2. The apparatus as defined in claim 1, wherein said means connected between said first and second arms comprises a rod pivotally connected at one end to the second arm, an adjustment block connected to the first arm and having a hole therethrough through which the other end of said rod extends, said rod being threaded at the end which extends through the block, and an adjusting knob threaded on said rod whereby the length of said rod may be adjusted.

3. The apparatus as defined in claim 2 further including, a reference point carried by said rod intermediate that portion which extends through said block, a scale formed on a cut-out face of said block adjacent which said reference point on said rod registers, and a vernier scale formed on said knob, whereby an accurate reading of the effective length of said rod is obtainable.

References Cited by the Examiner

UNITED STATES PATENTS

| | | | |
|---|---|---|---|
| 710,777 | 10/1902 | Hodge | 74—69 |
| 2,067,513 | 1/1937 | Talbot | 308—59 |
| 2,286,694 | 6/1942 | Talbot | 74—69 |
| 2,302,064 | 11/1942 | Sieg | 74—69 |
| 3,111,853 | 11/1963 | Wallis | 74—69 |

MILTON KAUFMAN, *Primary Examiner.*

BROUGHTON G. DURHAM, *Examiner.*

D. H. THIEL, *Assistant Examiner.*